United States Patent [19]

Nichols et al.

[11] 4,224,204

[45] Sep. 23, 1980

[54] USE OF HYDROCARBON POLYMERS TO IMPROVE OIL-CONTAINING WAXES

[75] Inventors: James W. Nichols; Rodney G. Lawrence; Lyle D. McClure, all of Tulsa, Okla.

[73] Assignee: Petrolite Corporation, St. Louis, Mo.

[21] Appl. No.: 21,290

[22] Filed: Mar. 16, 1979

[51] Int. Cl.$^2$ .............................................. C08L 91/00
[52] U.S. Cl. ............................ 260/23 H; 260/28.5 A; 260/33.6 AQ; 260/33.6 UB; 260/33.6 R
[58] Field of Search ....... 260/28.5 A, 23 H, 33.6 AQ, 260/33.6 UB, 33.6 R

[56] References Cited

U.S. PATENT DOCUMENTS

| | | | |
|---|---|---|---|
| 3,893,962 | 7/1975 | Walton et al. | 260/28.5 A |
| 3,903,030 | 9/1975 | Nordsiek et al. | 260/33.6 AQ |
| 3,926,900 | 12/1975 | Guzy et al. | 260/33.6 AQ |
| 3,933,708 | 1/1976 | Brinkman | 260/28.5 A |
| 4,022,729 | 5/1977 | Prickril | 260/28.5 A |
| 4,060,569 | 11/1977 | Woods et al. | 526/352.2 |
| 4,105,619 | 8/1978 | Kaufman | 260/28.5 A |

*Primary Examiner*—Melvyn I. Marquis
*Attorney, Agent, or Firm*—Sidney B. Ring; Hyman F. Glass

[57] ABSTRACT

This invention relates to the use of hydrocarbon polymers for example of the type described in U.S. Pat. No. 4,060,569 to bind oil contained in waxes so that, in end use performance, the wax more closely equals fully refined wax. Among other things, the hydrocarbon polymer not only inhibits and/or prevents the oil in the wax from "sweating" or exuding to the surface but also hardens the wax. The hydrocarbon polymers can also be used to thicken oil to a paste or gel.

11 Claims, No Drawings

USE OF HYDROCARBON POLYMERS TO IMPROVE OIL-CONTAINING WAXES

A world wide shortage of high grade waxes exists. For example, at present there is an extreme shortage of high grade paraffin waxes, which necessitates allocation. Thus, although there is a plentiful supply of soft hydrocarbon waxes such as soft paraffins, there is an acute shortage of hard paraffin waxes.

Although the addition of polymers such as polyethylenes to waxes increased their hardness, the presence of polyethylene in wax undesirably increases:
(1) the viscosity, and
(2) the cloud point of the blend.

In Ser. No. 926,763 filed July 21, 1978 the hydrocarbon polymers of U.S. Pat. No. 4,060,569 are blended into waxes such as natural waxes, hydrocarbon waxes etc., such as paraffin, etc., to obtain waxes which are characterized by improved hardness. The hardness of the blend is unexpectedly greater than the hardness of each component. In addition the blending of hydrocarbon polymers in waxes has a lesser effect on the undesirable properties of
(1) increased viscosities and
(2) increased cloud points that occur when polyethylenes are blended into wax.

For example, in Ser. No. 926,763, if one were to take a paraffin with a penetration of 12 and blend it with 1:1 with the hydrocarbon polymer with a penetration of 6, the resulting blend has a penetration as low as 2. Thus, one obtains an unusual product, one that is very hard, yet is relatively low melting, and has a relatively low viscosity and a relatively low cloud point. Hardness is measured by the needle penetration test ASTM D-1321, a standard for the petroleum wax industry.

Paraffin waxes are classified as slack wax, semi-refined, and fully refined. The U.S. Bureau of Mines classifies slack waxes and semi-refined waxes under one classification "Other Crystalline." Paraffin waxes having oil contents of 0.5% maximum are classified as fully refined paraffins. In 1969 fully refined paraffin constituted 45 percent of the total U.S. wax production as reported by the Bureau of Mines and in 1976 it still was at the same 45 percent level. "Other crystalline" paraffins have increased from 35 percent in 1969 to 42 percent in 1976. In recent years the increased demand has been on fully refined paraffin waxes resulting in shortage and allocations by many paraffin producers. Thus, there is a need for a synthetic additive that will harden the paraffin and bind the oil so that the end use performance of an oily paraffin can more closely equal fully refined paraffins.

We have now discovered that the performance of the hydrocarbon polymers of U.S. Pat. No. 4,060,569 is not limited to use with low oil content waxes such as natural waxes, hydrocarbon waxes, etc., such as paraffin waxes, etc., to obtain waxes which are demonstrably improved in hardness as described in Ser. No. 926,763 filed July 21, 1978, but can be expanded to include oil-containing waxes. We have found that when the hydrocarbon polymers of U.S. Pat. No. 4,060,569 are blended into oil-containing waxes such as natural waxes, hydrocarbon waxes, etc., such as paraffin waxes, etc., one obtains a hard wax of improved properties by binding the oil in the wax and hardening it so that the wax in end-use performance more closely equals fully refined wax. The use of hydrocarbon polymers not only inhibits and/or prevents the oil in the wax from "sweating" or exuding to the surface but also hardens the wax.

Further, a wide variety of oils can be thickened or hardened to pastes or gels with the hydrocarbon polymers of the invention. Examples of oils include vegetable oils, both drying and non-drying; petroleum or mineral oils of various classes including those of open-chain hydrocarbons, cyclic hydrocarbons or cycloparaffins, various oils obtained from petroleum products such as naphthas, gas fuel, lubricating and heavier oils; coal distillates, including naphthas, creosote oils, anthracene oils, ethereal oils, etc.; resin oils and wood distillates, including the distillates of turpentine, rosin spirits, pine oil and acetone oils; and animal oils.

In the past some microcrystalline waxes and more recently some polyethylenes have been used to bind the oil in paraffins. These materials are not very efficient and raise the cloud point of the paraffin. The hydrocarbon polymers of this invention are much more efficient and do not raise the cloud point of most paraffins. The cloud point is defined as the temperature at which the highest melting fractions begin to crystallize. High cloud point is an undesirable property for paraffin waxes in most cases. To overcome a high cloud point, the application temperature must be above the cloud point and this usually results in a number of other problems relating to the application temperature being too high for the material, such as, excess wax penetration in paper goods, too long cool-time and poor control of wax weight.

The addition of hydrocarbon polymers of this invention such as at about 1 to 5% level to high oil content paraffins results in an outstanding increase in oil retention. As the percentage of hydrocarbon polymers is increased above the 5% level, the increase in change begins to level out, but the hydrocarbon polymers can be used at any of the higher percentage levels.

These hydrocarbon polymers have excellent oil binding properties. These properties can be utilized to bind excess oil in paraffins. A paraffin wax with an oil content of 0.5% or more is considered to have a high oil content. When the oil is tied-up, the high oil content paraffin wax becomes a much more useful material which can be used in many applications where a fully refined paraffin is normally used. The reason oily paraffins can not be used in many applications is because the oil "sweats" or exudes from the paraffin, which results in an oily "feel" to the paraffin and may stain anything that comes in contact with the paraffin. In some paraffins with high oil content, free oil can be observed on the surface of the wax. With the hydrocarbon polymers of this invention, a wide variety of oils, as above exemplified, can be made into pastes or gels. The amount of hydrocarbon polymer added to oil will determine the consistency of the product.

The weight percentage of hydrocarbon polymer employed in the blend in the wax to inhibit exudation of oil will vary depending on many factors such as the particular wax, the particular hydrocarbon polymer, the hardness desired, etc. In general, as the percentage of hydrocarbon polymer in the wax increases, hardness also increases. Thus, one can employ about 0.5% or more by weight of hydrocarbon polymer such as from about 1 to 5% or more, such as from 5–50%, but preferably from about 1 to 10, with an optimum of about 5%.

Any suitable wax or wax-like material may be hardened according to this invention. These include petroleum waxes such as paraffin wax, microcrystalline wax, etc., natural waxes such as beeswax, carnauba, candellila, montan, peat wax, ouricury wax, esparto wax, rice wax, sugar cane wax, maize wax, etc., synthetic waxes such as amide waxes, ester waxes, etc., or any wax-like material which can be upgraded in accord with this invention. The only requirements are that the hydrocarbon polymer be compatible with the wax or wax-like material and capable of being upgraded in accord with this invention.

The hydrocarbon polymers employed in this invention are described and claimed in Ser. No. 644,138 filed Dec. 24, 1975, now U.S. Pat. No. 4,060,569 issued Nov. 29, 1977. This patent relates to hydrocarbon polymers having lower penetration or greater hardness (H), greater viscosities (V), higher molecular weights (MW), but having melting points (MP) and congealing points (CP) which are essentially no higher, but preferably lower than the original hydrocarbon, i.e., hydrocarbon Polymer's MW, V, H> original hydrocarbon hydrocarbon Polymer's MP, CP< original hydrocarbon.

These polymers are prepared by polymerizing hydrocarbons under free radical conditions at low pressures.

The polymers are unique in that although hydrocarbon polymers generally have higher molecular weight, greater viscosity and greater hardness than the starting hydrocarbon they generally have higher melting points and congealing points than the starting hydrocarbons.

Hydrocarbons employed are primarily alpha olefins of the formula RCH=CH$_2$ but also include alpha olefins of the vinylidene structure

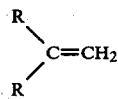

or a mixture of alpha olefins, vinylidenes, internal olefins and saturates. Because alpha olefins are primarily employed, this term is often used to indicate both alpha olefins and mixtures of various combinations of alpha olefins, vinylidenes, internal olefins and saturates.

U.S. Pat. No. 4,060,569 describes and claims alpha olefins which can be polymerized or copolymerized in the presence of free radicals at low pressures to yield polymers of increased molecular weight, higher viscosities, and greater hardness but lower melting and congealing points than the original alpha olefins from which they are derived.

Since low pressures are employed, less expensive equipment may be used. Since the polymers have low melting and congealing points they have advantages in processing applications where low melting and congealing points are necessary. These polymers have many uses, for example, they possess low shrinkage and are therefore useful as casting waxes. They are useful in printing inks where low temperature applications are needed. They are useful in applications where low melting and congealing points are desirable such as in hot melt adhesives, pour point depressants, carbon paper inks, coatings, etc. In addition, these materials can be oxidized to yield emulsifiable products which can be used in polishes, etc.

In addition, the oxidized products can be further reacted with isocyanates and/or other materials to improve their hardness and pigment dispersant properties.

The polymers of U.S. Pat. No. 4,060,569 have high viscosity (indicating high molecular weight) and low penetration. These properties are very desirable in a polymeric wax.

The melting point, however, will be low in comparison to its molecular weight. Because of its low melting point and congealing point the wax has processing advantages over higher melting point waxes. This depressed congealing point and melting point is a unique part of this invention. The molecular weight and viscosity of the products of this invention are usually indicative of waxes that have a much higher congealing point and melting point. An example is "BARECO" Polywax 2000. For a molecular weight of 1674 the congealing point is 233° F. and the melting point is 258.5° F., in contrast to the present invention where for a corresponding molecular weight (Example 4), the congealing point is 148° F. and the melting point is 165.7° F.

The melting point and the congealing point of the resulting wax is dependent upon the melting point and congealing point of the initial alpha olefin. The initial alpha olefin (or mixture of alpha olefins) in this invention is a solid at room temperature. The melting point and the congealing point of the final product is essentially no higher than the melting point and the congealing point of the initial alpha olefin. However, the viscosity and the hardness of the resulting wax are much greater than that of the original alpha olefin. The melting point and the congealing point of the initial alpha olefin can be adjusted by using blends of low melting point alpha olefins and high melting point alpha olefins.

The products of U.S. Pat. No. 4,060,569 have outstanding oil retention properties. They are very easy to dissolve in a number of solvents. The waxes also exhibit very low shrinkage because of the low degree of crystallinity that is apparent from their low density. Except for impurities present in the starting materials the product is homogeneous in nature, i.e., it is not merely a blend of a high molecular weight and hard material with a low molecular weight and soft material. If the product were merely a blend, then fractionation by a suitable solvent would reveal this. However, fractionation by a suitable solvent yielded two fractions; the lower melting point material appeared to comprise impurities present in the starting materials such as unreacted saturates and similar products while the harder material had physical properties similar to the overall product. This is illustrated in Example 19.

The properties of the final product of U.S. Pat. No. 4,060,569 can be altered in four ways: (1) starting material, (2) concentration of peroxide, (3) length of reaction time, and (4) reaction temperature. The melting point and congealing point of the final product is based on the initial material. The melting point and congealing point of the initial material are the upper limits for the final material. The peroxide concentration affects the final properties chiefly in three ways: (1) molecular weight and viscosity, (2) hardness, and (3) congealing and melting points. By using more peroxide the viscosity increases, indicating an increase in molecular weight with an increase in hardness and a decrease in melting and congealing points. If excess peroxide is used, the reaction tends to become unstable and a crosslinked gell may form. Temperature of reaction and time of reaction are interrelated as far as they affect the properties of the final product. The preferred temperature and time of reaction should be sufficient for the catalyst to go through eight half-lives. After eight half-lives the concentration of peroxide is approximately 4/10 of 1% the original concentration. For a reaction time less than eight half-lives of the peroxide the catalyst has not been economically used. After eight half-lives the reaction is slow. The reaction could be carried on for a longer period of time or a shorter period of time. The eight half-lives is a convenient time to use economically.

Hardness is also affected by the initial raw material. If the olefins used are branched then the resulting material will be branched and the penetration will not be as low as where the initial materials are linear. By using linear raw materials the melting point and congealing point are higher than if branched olefins are used. The molecular weight of the initial material is also important. Using a low molecular weight branched starting material, the resulting melting point, congealing point, and hardness will be lower than if the original material was linear and had a high molecular weight.

The selection of the peroxide catalyst is dependent on many factors: cost, decomposition products, and the decomposition temperature. The preferred peroxide catalyst is di-t-butyl peroxide. The reason for this is its low cost, its decomposition temperatures, and the ease in which its decomposition products (t-butyl alcohol and acetone) can be removed from the resulting wax.

The reaction procedure is dependent upon which catalyst is used. When using di-t-butyl peroxide the catalyst must either be added to the initial charge material while it is at a temperature below 110° C. or the peroxide must be added under pressure. When using di-t-butyl peroxide the reaction is run under nitrogen pressure of at least 20 psi. This maintains the peroxide in the liquid wax. After the proper reaction time, the wax is then vacuum stripped to remove the decomposition products. Failure to remove decomposition products can lead to undesirable effects on the melting point, congealing point, penetration and flash.

The molecular weights of the product of this invention can vary widely. By way of illustration, they can vary from at least about 300, such as from about 300 to 6000 or more, for example from about 650 to 5000, but preferably from about 750 to 3000. The molecular weight will depend upon the amount of peroxide, the temperature of the reaction, the time of the reaction, and the starting materials.

Many polymerizations are done in a solution. However, this polymerization is generally carried out in bulk. The advantage of this is that separation of the wax from the solvent is avoided. However, the products of this invention can also be produced by solution polymerization if desired.

The alpha olefins employed in this invention are of the following idealized formula $$RCH=CH_2$$

where R is alkyl, for example, having about 4 to 50 or more carbons. These include monomers such as 1-hexene, 1-octene, 1-decene, 3-methyl decene-1, 1-tetradecene, etc. They may be linear or branched.

Also included within the term alpha olefin are those which are prepared by polymerizing olefins such as ethylene in the presence of Ziegler type catalysts.

Illustrative of these types of alpha olefins are those sold by Gulf, for example:

(1) Gulf Alpha Olefin Fraction $C_{20}$–$C_{24}$ which contains the following typical carbon distribution:

| | |
|---|---|
| $C_{18}$ | 1 wgt. % |
| $C_{20}$ | 49 |
| $C_{22}$ | 42 |
| $C_{24}$ | 8 |
| $C_{26}$ | 0.1 |

(2) Gulf Alpha Olefin Fraction $C_{24}$–$C_{28}$ which contains the following typical carbon distribution:

| | |
|---|---|
| $C_{22}$ | 0.3 wgt. % |
| $C_{24}$ | 28 |
| $C_{26}$ | 44 |
| $C_{28}$ | 20 |
| $C_{30}+$ | 8 |

(3) Gulf Alpha Olefin Fraction $C_{30}+$ which contains the following typical distribution: 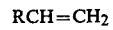

TABLE 1

| | Chevron Chemical Co. CARBON RANGE | | | | | |
|---|---|---|---|---|---|---|
| | $C_6$–$C_9$ | $C_{10}$ | $C_{11}$–$C_{14}$ | $C_{15}$–$C_{18}$ | $C_{18}$–$C_{20}$ | $C_{15}$–$C_{20}$ |
| Straight Chain Mono Alpha Olefins, Wg. % | 89 | 90 | 89 | 91 | 86 | 88 |
| Diolefins, Wt. % | 4 | 5 | 6 | 8 | 4 | 5 |
| Paraffins, Wt. % | 3 | 2 | 1 | 2 | 9 | 5 |
| Appearance | Clear and bright and free of sediment | | | | | |
| Color, Saybolt | +18 | +17 | +14 | +7 | <−16 | −12 |
| Density (20°/4° C.) g/ml | 0.713 | 0.751 | 0.770 | 0.783 | 0.797 | 0.787 |
| Density (60°/60° F.) lb/gal | 5.95 | 6.27 | 6.42 | 6.57 | 6.68 | 6.60 |
| Flash Point, TOC, °F. | <30 | 103 | 162 | 260 | 330 | 280 |
| Pour Point, °F. | − | − | −20 | +40 | +70 | +55 |
| Bromine No. g/100g | 165 | 118 | 98 | 73 | 57 | 67 |
| Water Content, ppm | 130 | 130 | 130 | 80 | 40 | 50 |
| Sulfur content, ppm | 5 | 8 | 10 | 15 | 15 | 15 |
| Carbon Number Distribution, Wt. % | | | | | | |
| $C_5$ | 2 | | | | | |
| $C_6$ | 39 | | | | | |
| $C_7$ | 24 | | | | | |
| $C_8$ | 17 | | | | | |
| $C_9$ | 16 | 4 | | | | |
| $C_{10}$ | 2 | 95 | 1 | | | |
| $C_{11}$ | | 1 | 27 | | | |
| $C_{12}$ | | | 24 | | | |
| $C_{13}$ | | | 24 | | | |
| $C_{14}$ | | | 23 | 1 | | 1 |

TABLE 1-continued

| | Chevron Chemical Co. CARBON RANGE | | | | | |
|---|---|---|---|---|---|---|
| | $C_6$–$C_9$ | $C_{10}$ | $C_{11}$–$C_{14}$ | $C_{15}$–$C_{18}$ | $C_{18}$–$C_{20}$ | $C_{15}$–$C_{20}$ |
| $C_{15}$ | | | 1 | 29 | | 17 |
| $C_{16}$ | | | | 28 | | 18 |
| $C_{17}$ | | | | 27 | 1 | 17 |
| $C_{18}$ | | | | 1 | 37 | 15 |
| $C_{19}$ | | | | 1 | 37 | 15 |
| $C_{20}$ | | | | | 30 | 12 |
| $C_{21}$ | | | | | 9 | 3 |
| Average Molecular Weight | 100 | 140 | 174 | 228 | 269 | 244 |

Other alpha olefins can also be employed individually, in combination, or as components of commercial raw materials.

The term alpha olefin as employed herein relates primarily to alpha olefins of the formula $RCH=CH_2$ but does not exclude alpha olefins of the vinylidene structure

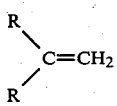

or a mixture of alpha olefins, vinylidenes, internal olefins and saturates.

Any suitable free radical catalyst can be employed. Thus, any compound capable of forming free radicals can be employed. In practice, the most convenient free radical forming compounds are peroxides and hydroperoxides and a wide variety of those compounds can be employed.

Peroxides and hydroperoxides are illustrated by the general formula

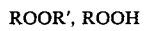

where R and R', which may be the same or different, are hydrocarbon or substituted hydrocarbon groups, for example, alkyl, aryl, cycloalkyl, aralkyl, alkaryl, heterocyclic, etc.

Any suitable amount of peroxides can be employed provided it is capable of acting as a catalyst in the reaction. In practice a molar ratio of at least about 0.005 of peroxide to alpha olefin is employed, such as from about 0.01–0.35 or more, for example from 0.02–0.35, such as from about 0.025–0.32, but preferably from about 0.04 to 0.30.

A convenient measure of the effective presence of peroxide is its half-life which is conveniently employed as a measure of reaction time based on the number of half-lives.

In general, reaction time is from about 1 to 20 or more half-lives, such as from about 3 to 15 half-lives, for example, from 4 to 12 half-lives, but preferably from about 5 to 10 half-lives.

Although most polymerizations using peroxides to prepare thermoplastic polymers are carried out at high pressure, the present polymerizations are carried out at low pressures. The only pressure that is needed is that to insure that the peroxide or one of the alpha olefins does not vaporize from the reaction. In certain instances, such as in Example 15, no pressure was needed.

A wide variety of peroxides can be employed. Nonlimiting examples are: di-t-butyl peroxide, t-butyl perbenzoate, t-butyl peracetate, benzoyl peroxide, and t-butyl peroctoate. The temperature at which this reaction is carried out is dependent upon the peroxide used. With a peroxide that has a low decomposition temperature (like t-butyl peroctoate) then the temperature of the reaction can be low. However, for a peroxide that has a high decomposition point (such as di-t-butyl peroxide) then the reaction temperature will be higher. The temperature of the reaction is normally set such that the peroxide would have a half-life between one-half hour and three hours. This, however, does not exclude using higher temperatures or lower temperatures. Another factor in determining the temperature of the reaction is reactor control and economics. If a higher temperature is used then the reaction time will be shorter; however, the control of the process will be more difficult. By using a lower reaction temperature the process is very easy to control but the longer reaction time is an economic disadvantage and undesirable.

In carrying out the process, the alpha olefin and a peroxide are reacted at a temperature sufficiently high to promote free radical formation. Since heat promotes free radical formation, a temperature sufficiently high to promote the decomposition of the peroxide, without causing decomposition of reactants and products, is employed. Depending on the peroxide, temperatures of about 40°–250° C., such as about 80° to 200° C., for example about 100° to 180° C., but preferably about 130° to 165° C., are employed. The temperature should be sufficiently high to keep all reactants in solution or in a molten state.

In the case of di-t-butyl peroxide the best yields are obtained in the ranges of about 100° to 250° C., but preferably about 130° to 165° C.

Any suitable free-radical producing agent capable of forming reactive sites can be employed. These include peroxides, hydroperoxides, etc., for example benzoyl peroxide, acetyl peroxide, 2,4-dichlorobenzoyl peroxide, di-t-butyl peroxide, tert-butyl hydroperoxide, methyl benzyl hydroperoxide, cumene hydroperoxide, peracetic acid, tert-butylpermaleic acid, lauryl peroxide, methyl ethyl ketone peroxide, dicumyl peroxide, di-tert-butyl diperphthalate, tert-butyl peracetate, and the like.

Other sources of free radicals besides peroxides can also be employed, for example high energy ionizing irradiation, etc., cobalt in conjunction with hydroperoxides, inorganic peroxy compounds such as persulfates, hydrogen peroxide, etc., azo compounds of the general formula $R-N=N-R$ such as azobenzene, azomethane, azobisisobutyronitrile, etc., acyl-aryl nitrosoamides such as nitrosoanilide, etc.

The following examples are presented for purposes of illustration and not of limitation.

EXAMPLE 1

Typical properties of Gulf $C_{30}+$ Alpha Olefin which is used as a starting material in many examples are shown below as illustrative of a starting material and to list the tests that are used in evaluation. Its properties are presented in the following Table Example 1.

| | |
|---|---|
| Flash (ASTM D-92) (°F.) | 500 |
| Vis. @ 210° F. (SUS) (ASTM D-88) | 61 |
| Vis. @ 300° F. (SUS) (ASTM D-88) | 42 |
| Color (Saybolt) D-156 | 2.0 |
| C.P. (ASTM D-938) (°F.) | 160 |
| M.P. (ASTM D-127) (°F.) | 174.5 |
| Pen. @ 77° F. (.1MM) (ASTM D-1321) | 14 |
| Pen. @ 110° F. (.1MM) (ASTM D-1321) | 48 |
| Pen. @ 140° F. (.1MM) (ASTM D-1321) | 180 |
| Acid No. | Nil |
| Sap. No. | Nil |
| Molecular Weight Vapor Pressure Osmometry (VPO) | 510 |

Chemical Composition 1.4% Saturates
67.5% Normal Alpha Olefins
25.4% Vinylidene Olefins
5.7% Internal Olefins

EXAMPLE 2

This example is presented to show that the products of the invention are not the result of thermally initiated reaction only. The data shown below is the result of holding Gulf $C_{30}+$ Alpha Olefin at 153° C. (307° F.) under a 100 lb. psig nitrogen pressure (to prevent oxidation of the material) for eight hours without peroxides. This simualtes the reaction time of approximately 9.0 half-lives of di-t-butyl peroxide. The results are presented in the following Table Example 2.

| | |
|---|---|
| Flash (°F.) | 515 |
| Vis. @ 210° F. (SUS) | 64 |
| Vis. @ 300° F. (SUS) | 43 |
| Color (ASTM) 1500 | 0.5+ |
| C.P. (°F.) | 159 |
| M.P. (°F.) | 175.5 |
| Pen. @ 77° F. | 11 |
| Pen. @ 110° F. | 44 |
| Acid No. | Nil |
| Sap. No. | Nil |

EXAMPLE 3

2,000 grams of Gulf $C_{30}+$ Alpha Olefin was mixed with 150 grams of di-t-butyl peroxide (this corresponds to a molar ratio of 0.262 based on the $C_{30}+$). It was then reacted in an agitated vessel under 80 psig of nitrogen pressure at 141° C. (286° F.) until 8.0 half-lives of the peroxide had elapsed. A sample was drained and then vacuum stripped at 29 in. Hg. vacuum until bubbling stopped. Data shown below gives the properties of the resultant material. Comparing this data with that in Example 1 shows the extent of reaction. Although the product of this invention is hard and viscous, the congealing point and melting point of the reaction product are lower than the congealing point and melting point of the charge stock.

(In certain instances the melting points and congealing points of the products of U.S. Pat. No. 4,060,569 may be reported to be erroneously high, because high viscosities in the products may make measurements difficult. To avoid the difficulty, the products will be described as having melting and congealing points which are essentially in the range of the original alpha olefin or lower, depending on the accuracy of measurement, the amount of impurities in the product, etc.)

This material has excellent oil retention properties, low shrinkage upon cooling and a glossy surface. The results are presented in the following Table Example 3.

| | |
|---|---|
| Flash (°F.) | 570 |
| Vis. @ 300° F. (SUS) | 594 |
| Color (ASTM) | 0.5— |
| C.P. (°F.) | 142 |
| M.P. (°F.) | 160.2 |
| Pen. @ 77° F. | 4.5 |
| Pen. @ 110° F. | 22 |

EXAMPLE 4

2,000 grams of Gulf $C_{30}+$ Alpha Olefin was mixed with 100 grams of di-t-butyl peroxide. The amount of peroxide used corresponds to a molar ratio of 0.175 based on moles of $C_{30}+$. The purpose of this example is to show the effect of catalyst concentration on the resulting molecular weight and physical properties. This mixture was then reacted under 80 psig of nitrogen pressure at 140° C. until 15 half-lives of peroxide had been achieved. The material was then drained and the decomposition products of the peroxide (t-butyl alcohol and acetone) were stripped from the product wax. This stripping was done by subjecting the product wax to 29 in. mercury vacuum until the bubbling stopped. Resulting data is shown below. As can be seen this wax is less viscous than that produced in Example 3. This is the result of decreased molecular weight of this wax versus that in Example 3. An infrared spectrum of this wax showed that there still were some vinyl and vinylidene groups remaining in the wax. However, an infrared spectrum of the wax in Example 3 showed practically no vinyl or vinylidene groups present. This wax was also very hard and has excellent oil retention properties. The results are presented in the following Table Example 4.

| | |
|---|---|
| Flash (°F.) | 550 |
| Vis. @ 210° F. (SUS) | 470 |
| Vis. @ 300° F. (SUS) | 155 |
| Color (ASTM) | 0.5— |
| C.P. (°F.) | 148 |
| M.P. (°F.) | 165.7 |
| Pen. @ 77° F. | 5.5 |
| Pen. @ 110° F. | 24 |

EXAMPLE 5

2,000 grams of Gulf $C_{30}+$ Alpha Olefin and 25 grams of di-t-butyl peroxide (molar ratio 0.0437 based on $C_{30}+$) were mixed and then reacted at 152° C. (306° F.) under 100 psig nitrogen pressure in an agitated vessel until 8.0 half-lives of the peroxide had been reached. At this point the sample was drained. Part of the sample was then vacuum stripped at 29 in. Hg. until the bubbling stopped. The results are shown below. The purpose of this example is to again show the effect of catalyst concentration on the final properties of the material. As can be seen this wax is not as viscous as those in Examples 3 and 4 (has a lower molecular weight), but it is a hard wax.

The results are presented in the following Table Example 5.

| | |
|---|---|
| Flash (°F.) | 515 |
| Vis. @ 210° F. (SUS) | 90 |
| Vis. @ 300° F. (SUS) | 65 |
| Color (ASTM) | 0.5— |
| C.P. (°F.) | 154 |
| M.P. (°F.) | 172.0 |
| Pen. @ 77° F. | 5.5 |
| Pen. @ 110° F. | 32.0 |

EXAMPLE 6.

2,000 grams of Gulf $C_{30}+$ Alpha Olefin and 200 grams of di-t-butyl peroxide were reacted in an agitated vessel under 80 psig nitrogen pressure at 140° C. (284° F.). After 11 half-lives of the peroxide the material was gelled in the reactor. It exhibited signs of being highly crosslinked. This reaction product is highly undesirable. The gelling is a result of a combination of two factors: (1) the catalyst concentration and (2) the reaction time. Intermediate samples were taken of this example. After 3.5 half-lives the material was still liquid but it is highly viscous. The maximum amount of peroxide that is generally used for 8.0 half-lives reaction time at 285° F. is approximately 0.28 on a molar basis. Above that catalyst concentration the reaction time is shorter if gellation of the wax is to be prevented.

Listed below are intermediate samples taken during the above experiment that were vacuum stripped as the other samples have been. As can be seen, reacting DTBP* at a molar ratio of 0.35 for 1.5 half-lives gives a product whose properties would be anticipated for a reaction between DTBP and Gulf $C_{30}+$ Alpha Olefin at a molar ratio of 0.226. (0.226 is the equivalent amount of peroxide that became activated in 1.5 half-lives $(0.35\times(1-(0.5)^{1.5})=0.226)$.
*di-t-butyl peroxide

| Length of Reaction (Half-lives) | 1.5 | 3.5 |
|---|---|---|
| Flash (°F.) | 540 | 590 |
| Vis. @ 210° F. (SUS) | 630 | 2903 |
| Vis. @ 300° F. (SUS) | 228 | 1130 |
| Color (ASTM) | 0.5— | 0.5+ |
| C.P. (°F.) | 146 | 153 |
| M.P. (°F.) | 162.7 | 162.5 |
| Pen. @ 77° F. | 6.0 | 4.0 |
| Pen. @ 110° F. | 25.0 | 18 |

EXAMPLE 7

100 parts Gulf $C_{30}+$ Alpha Olefin and 5 parts DTBP were mixed and reacted at 296° F. in a closed, agitated vessel under 50 psig of nitrogen. Listed below are the viscosities of samples taken at the designated time during the run. As can be seen, the viscosity does increase as time of reaction increases but at a decreasing rate. This is the reason the reaction is normally carried on for approximately 8.0 half-lives.

| Time of Reaction (Half-lives) | Viscosity @ 300° F. (SUS) |
|---|---|
| 3.5 | 99 |
| 4.9 | 116 |
| 6.6 | 131 |
| 8.3 | 136 |
| 12.0 | 148 |

EXAMPLE 8

600 grams of Gulf $C_{30}+$ Alpha Olefin was reacted with 30 grams of di-t-butyl peroxide at 260°–270° F. (130° C.) until 7.5 half-lives had been achieved. The sample was drained and stripped and the results are listed below. By comparing these with those of Example 4 the effect of temperature is noted. Lower temperatures tend to make the catalyst more effective (increased viscosity over Example 4).

The results are presented in the following Table Example 8.

| | |
|---|---|
| Flash (°F.) | 565 |
| Vis. @ 210° F. (SUS) | 625 |
| Vis. @ 300° F. (SUS) | 237 |
| Color (ASTM) | 0.5— |
| C.P. (°F.) | 147 |
| M.P. (°F.) | 166.0 |
| Pen. @ 77° F. | 6.5 |
| Pen. @ 110° F. | 20.0 |
| Pen. @ 140° F. | 184.0 |

EXAMPLE 9

100 parts of Gulf $C_{30}+$ Alpha Olefin was reacted with 7.5 parts of di-t-butyl peroxide at 300° F. until 8.0 half-lives had been achieved. At this point the sample was cooled to 270° F. and vacuum stripped. The results are shown below. Comparing these results with those of Example 3 show that an increase in reaction temperature decreases the extent of reaction (lower viscosity).

The results are presented in the following Table Example 9.

| | |
|---|---|
| Flash (°F.) | 520 |
| Vis. @ 300° F. (SUS) | 348 |
| Color (ASTM) | 2.0 |
| C.P. (°F.) | 140 |
| M.P. (°F.) | 161.5 |
| Pen. @ 77° F. | 5.5 |
| Pen. @ 110° F. | 25.0 |

EXAMPLE 10

600 grams of a wax with a molecular weight of 680 and an alpha olefin content of approximately 60% was reacted with 34 grams of di-t-butyl peroxide (0.262 molar ratio based on the wax) at 141° C. (286° F.) until 8.0 half-lives of the peroxide had been achieved. At this point the sample was drained and stripped as in the preceding examples. Presented below are properties of the charge stock and the resulting product of the polymerization. As can be seen, the polymerized product has a higher viscosity and greater hardness than the charge stock; however, the congealing point and the melting point are lower. This example shows the effect of charge stock. The use of a harder charge stock results in a harder product.

The results are presented in the following Table Example 10.

|  | Charge Stock | Final Product |
|---|---|---|
| Flash (°F.) | 580 | 540 |
| Vis. @ 300° F. (SUS) | 52 | 540 |
| Color (ASTM) | 15 (Saybolt) | 0.5 — |
| C.P. (°F.) | 202 | 193 |
| M.P. (°F.) | 213 | 208.0 |
| Pen. @ 77° F. | 2.5 | 2.0 |
| Pen. @ 110° F. | 2.5 | 4.0 |
| Pen. @ 140° F. | 17.0 | 10.0 |
| VPO | 680 | 1562 |

EXAMPLE 11

600 grams of Gulf $C_{24-28}$ Alpha Olefin were mixed and reacted with 42 grams of di-t-butyl peroxide (molar ratio 0.175) at 288° F. for 10.7 half-lives. The polymerized product was harder and more viscous, but had a lower melting point. This example shows that by using a lower molecular weight material the final product is softer than if a higher molecular weight starting material was used.

The results are presented in the following Table Example 11.

|  | Polymerized Product |  | Charge Stock |  |
|---|---|---|---|---|
| Flash (°F.) | 515 |  | 420 |  |
| Color | 6.0 | Saybolt | 16 | Saybolt |
| Vis. @ 210° F. (SUS) |  |  | 39 |  |
| Vis. @ 300° F. (SUS) | 795 |  | 126 |  |
| C.P. (°F.) | 123 |  | 126 |  |
| M.P. (°F.) | 123.5 |  | 136 |  |
| Pen. @ 77° F. | 13.0 |  | 99 |  |
| Pen. @ 110° F. | 70 |  | Too Soft |  |

EXAMPLE 12

1080 grams of Gulf $C_{30}+$ Alpha Olefin and 120 grams of the wax used in Example 10 were mixed and reacted with 87.8 grams of di-t-butyl peroxide (this has a molar ratio of 0.262). The temperature of reaction was 139° C. (282° F.). It lasted until 8.0 half-lives had been achieved. At this point the sample wax was drained and vacuum stripped. Shown below are the properties of both the blend and the reacted copolymer. As can be seen the polymerized product is more viscous and is much harder than that of the blend. However, the blend has a higher congealing point and melting point. From this example it can be seen that by using the proper blend, the melting point and congealing point of the copolymer and the resulting product can be adjusted.

The results are presented in the following Table Example 12.

|  | Blend |  | Copolymer |
|---|---|---|---|
| Flash (°F.) | 495 |  | 565 |
| Vis. @ 300° F. (SUS) | 40 |  | 472 |
| Color (ASTM) | 0.5 — |  | 0.5 — |
| C.P. (°F.) | 176 |  | 153 |
| M.P. (°F.) | 193.0 |  | 179.5 |
| Pen. @ 77° F. | 11.5 |  | 2.5 |
| Pen. @ 110° F. | 48.0 |  | 16.5 |
| Pen. @ 140° F. | 220 |  | 98 |
| VPO | 523 | (Calculated) | 2595 |

4,060,569 has also determined that alpha olefins also react with hydrocarbons having no unsaturated groups. For example, alpha olefins react with saturated molecules such as polymers and natural or synthetic waxes. Thus, alpha olefins can react with plastic and tank bottom microcrystalline waxes, Fisher Tropsch waxes, ozakorite waxes, Utah waxes, polyethylenes, polypropylenes, or other polyalkylene polymers or copolymers, "BARECO" polywaxes, carnauba waxes, ouricury waxes, candelilla waxes, montan waxes, etc. Stated another way, the alpha olefins of this invention can also be copolymerized with saturated waxes or polymers. Although we do not wish to be bound by theoretical considerations, polymerization may occur by means of hydrogen abstraction from the saturates so as to form free radicals which combine with the alpha olefin reactants and/or products to form the reaction products of this invention.

The following example is presented to illustrate the reaction of alpha olefins with commercial saturated polyethylenes known as "EPOLENE" waxes. These are low molecular weight polyethylenes prepared by cracking high molecular weight polyethylenes, followed by hydrogenation to yield saturated polyethylenes.

EXAMPLE 13

540 grams of Gulf $C_{30}+$ Alpha Olefin and 60 grams of Eastman Epolene N-10 were mixed with 30 grams of di-t-butyl peroxide. The mixture was reacted in an agitated vessel under 80 psig of nitrogen at 285° F. until 9.0 half-lives had elapsed. Shown below are properties of the blend and of the reacted copolymer. As is consistent with the other examples, the melting point and congealing point of the blend is higher than that of the copolymer. However, the copolymer is more viscous and is much harder.

The results are presented in the following Table Example 13.

|  | Blend | Copolymer |
|---|---|---|
| Flash (°F.) | 495 | 570 |
| Color (ASTM) | 0.5 + | 0.5 — |
| Vis. @ 210° F. (SUS) | 80 |  |
| Vis. @ 300° F. (SUS) | 58 | 621 |
| C.P. (°F.) | 176 | 164 |
| M.P. (°F.) | 196 | 188 |
| Pen. @ 77° F. | 12.5 | 2.5 |
| Pen. @ 110° F. | 30.0 | 14.0 |
| Pen @ 140° F. | 185 | 102 |
| VPO |  | 2075 |

U.S. Pat. No. 4,060,569 has also found that by following its process, saturated waxes and polymers such as described above react even in the absence of alpha olefins to form products of this invention. Although we do not wish to be bound by theoretical considerations, it is believed that hydrogens are abstracted from the saturates to form free radicals which join a plurality of polymer molecules, thus producing a higher polymer. The following example is presented for purposes of illustration employing "BARECO" polywax, which is a linear polyethylene.

EXAMPLE 14

600 grams of "BARECO" Polywax 655* and 30 grams of di-t-butyl peroxide (molar ratio=0.227) were mixed and reacted in a closed, agitated vessel with 80 psig nitrogen pressure at 300° F. for 16 half-lives to yield a product having the properties shown in Table Example 14 below. There was a reaction, but not to the extent of that when using alpha olefins. This example shows that saturates do react in a manner consistent with the other examples to yield a product having lower congealing and melting points and higher viscosity. Table Example 14.

*a linear polyethylene having a molecular weight of 700.

|  | Charge Stock | Reaction Product |
|---|---|---|
| Flash (°F.) | 565 | 580 |
| Vis. @300° F. (SUS) | 49 | 60 |
| Color (ASTM) | .5 — | 1. — |
| C.P. (°F.) | 205 | 200 |
| M.P. (°F.) | 216 | 214.5 |
| Pen. @ 77° F. | 2.0 | 1.0 |
| Pen. @ 110° F. | 4.0 | 5.0 |
| Pen. @@ 140 F. | 12.0 | 16.0 |
| Molecular Weight (by VPO) | 664 | 787 |

EXAMPLE 15

100 parts of Gulf $C_{30}$+Alpha Olefin and 5 parts t-butyl perbenzoate (molar ratio equal to 0.130) were reacted at 120° C. for three hours in an oven with a nitrogen purge. No pressure was employed in this example. The sample was then vacuum stripped for two hours at 120° C. to remove the decomposition products (benzoic acid and t-butyl alcohol). Shown below are the results of this example. The purpose of this example is to show that peroxides other than di-t-butyl peroxide can be used successfully.

The results are presented in the following Table Example 15.

| Flash(°F.) | 485 |
|---|---|
| Vis. @ 210° F. (SUS) | 226 |
| Vis. @ 300° F. (SUS) | 91 |
| C.P. (°F.) | 154 |
| M.P. (°F.) | 172.5 |
| Pen. @ 77° F. | 7.0 |
| Pen. @ 110° F. | 48 |
| Pen. @ 140° F. | Too Soft |
| Color | 0.5+(Murky) |

EXAMPLE 16

2,000 grams of Gulf $C_{30}$+Alpha Olefin and 60 grams of Lupersol 70 (75% t-butyl peracetate (molar ratio 0.088) and 25% C-12 solvent) were reacted in an agitated vessel under 100 psig of nitrogen at 130° C. After 12 half-lives the sample was drained and the decomposition products and the mineral oil (peroxide diluent) were vacuum stripped from the resulting wax.

The results are presented in the following Table Example 16.

| Flash (°F.) | 480 |
|---|---|
| Vis. @ 210° F. (SUS) | 99 |
| Vis. @ 300° F. (SUS) | 54 |
| Color (ASTM) | 0.5 — |
| C.P. (°F.) | 155 |
| M.P. (°F.) | 172.5 |
| Pen. @ 77° F. | 5.0 |
| Pen. @ 110° F. | 33.5 |

EXAMPLE 17

In the above examples, the reactions are always vacuum stripped. The reason for this is that the decomposition products of the peroxide have a deleterious effect upon the polymerized product. Shown below are results of a sample of wax from Example 16 that was not vacuum stripped. As can be seen, the unstripped sample has a lower melting point and a higher penetration.

The results are presented in the following Table Example 17.

| Flash (°F.) | 510 |
|---|---|
| Vis. @ 210° F. (SUS) | 86 |
| Vis. @ 300° F. (SUS) | 54 |
| Color (ASTM) | 0.5 — |
| C.P. (°F.) | 154 |
| M.P. (°F.) | 166.7 |
| Pen. @ 77° F. | 7.5 |
| Pen. @ 110° F. | 36.0 |

EXAMPLE 18

The polymerized product can be oxidized to form a wax that is suitable for floor polishes and emulsions. A product similar to that of Example 3 was oxidized at 250° F. for 25 hours. Shown below are the products of this oxidation and the charge stock before oxidation.

The results are presented in the following Table Example 18.

|  | Charge Stock | Oxidized Product |
|---|---|---|
| Flash (°F.) | 560 | 520 |
| Viscosity @ 300° F. (SUS) | 623 | 666 |
| Color (ASTM) | 0.5+ | 1.5 — |
| C.P. (°F.) | 140 | 140 |
| M.P. (°F.) | 165.0 | 159.0 |
| Pen. @ 77° F. | 4.5 | 4.5 |
| Pen. @ 110° F. | 22.0 | 23.5 |
| Acid No. | Nil | 16.3 |
| Sap. No. | Nil | 33.88 |

EXAMPLE 19

To show the homogeneity of the polymerized wax the polymerized product was subjected to fractionation in methyl isobutyl ketone. Two extractions were done on the material produced in Example 3, one at 80° F. and one at 100° F. Both used a solvent to wax ratio of nine to one. The results of these extractions are listed below. The amount of wax extracted at 80° F. was far less than that extracted at 100° F. From this data it can be seen that there is a small amount of low molecular weight and low melting point material. However, most of the material has a congealing point, melting point, and penetration approximately the same as that of the polymerized product. This shows that the polymerization product is not a simple blend. If it was a blend then the filtrate would contain much more of the material and the cake would be of much higher congealing point, melting point, and hardness.

The results are presented in the following Table Example 19.

| Temperature of Extraction |  | 80° F. | 100° F. |
|---|---|---|---|
| Cake: | Yield | 91.0% | 80.1% |
|  | C.P. (°F.) | 149 | 150 |
|  | M.P. (°F.) | 162 | 162.2 |
|  | Pen. @ 77° F. | 3.0 | 3.0 |
| Filtrate: | Yield | 9.0% | 19.9% |
|  | C.P. (°F.) | 120 | 132 |
|  | M.P. (°F.) | 124.5 | 146 |
|  | Pen. @ 77° F. |  | 28.5 |

In summary, U.S. Pat. No. 4,060,569 relates to a process of preparing a polymer which comprises reacting (1) a hydrocarbon, but preferably an olefin, and most preferably an alpha olefin, (for example vinyl or vinylidene) alone or as copolymers (2) under free radical conditions (for example, in the presence of peroxides)

(3) at pressures which are sufficient to keep the peroxides and reactants from vaporizing (for example, under 500 psi but preferably under 150 psi) so as to yield polymer products having the following properties:

(a) higher molecular weight
(b) higher viscosities
(c) greater hardness and
(d) lower penetration
but having a
(e) congealing point and melting point which are essentially no higher than the starting alpha olefin containing material.

This invention also includes the polymerization of saturated hydrocarbons either alone or in combination with alpha olefins.

Although alpha olefins are preferred, U.S. Pat. No. 4,060,569 also includes the polymerization of olefins which are not alpha olefins.

The above section described the hydrocarbon polymers of U.S. Pat. No. 4,060,569.

The following are examples of commercial hydrocarbon polymers which can be employed in this invention. They are prepared from a $C_{30}+\alpha$-olefin.

TABLE 2

| Property | Test Method | Typical Properties Units | *VYBAR ® 260 | *VYBAR ® 103 |
|---|---|---|---|---|
| Molecular Wgt. | | | 2600 | 2830 |
| Melting Point | ASTM D-36 Mod. | °F. (°C.) | 124(51) | 162(72) |
| Pour Point | ASTM D-97 | °F. (°C.) | N/A | N/A |
| Viscosity | | | | |
| @ 32° F. (0° C.) | ASTM D-2669 | Centipoise | — | — |
| @ 50° F. (10° C.) | | | | |
| @ 100° F. (37.8° C.) | ASTM D-3236 | | — | — |
| @ 150° F. (65.6° C.) | | | 915 | — |
| @ 210° F. (98.9° C.) | | | 350 | 360 |
| @ 250° F. (121° C.) | | | 180 | 185 |
| @ 300° F. (149° C.) | | | 104 | 107 |
| Penetration | | | | |
| @ 77° F. (25° C.) | ASTM D-1321 | 0.1 mm | 13 | 5 |
| @ 110° F. (43° C.) | | | 110 | 20 |
| @ 130° F. (54° C.) | | | — | 57 |
| @ 140° F. (60° C.) | | | — | 153 |
| Density | | | | |
| @ 75° F. (24° C.) | ASTM D-1168 | grams/cc | 0.90 | 0.92 |
| @ 200° F. (93° C.) | | | 0.79 | 0.77 |
| Iodine Number | ASTM D-1959 | $ogI_2$/g sample | 15 | 14 |
| Color | ASTM D-1500 | | 0.5 | 0.5 |

N/A Not Applicable
*Registered Trademark, Petrolite Corp., marketed by Bareco Division.

The blends can be prepared by any suitable means. In practice they are prepared by melting the wax and the hydrocarbon polymer in the desired proportions and stirring the melted compounds to get a homogenous blend. They are in essence physical blends.

The following examples are presented for purposes of illustration and not of limitation.

TABLE 3

| VYBAR ® 103 as as Additive to Oily Paraffins to Improve Their Oil Retention Properties | | | | | | | | | | |
|---|---|---|---|---|---|---|---|---|---|---|
| Wgt % VYBAR ® 103 | 0% | 2% | 3% | 4% | 5% | 7.5% | 10% | 15% | 20% | 50% |
| Paraffin | | | | | | | | | | |
| Melt Point 141° F., 2.16% Oil | | | | | | | | | | |
| 24 hrs @ 107° F. | | | | | | | | | | |
| Area cm² | — | — | — | — | — | — | — | — | — | — |
| % of bleed | 90 | nil | nil | nil | nil | nil | — | — | — | — |
| Melt Point, 140° F., 9-10% Oil | | | | | | | | | | |
| 24 hrs. @ 107° F. | | | | | | | | | | |
| Area cm² | 227 | 165 | 83.6 | 39.8 | — | — | — | — | — | — |
| % of bleed | 1292 | 940 | 476 | 227 | 50 | 5 | — | — | — | — |
| Melt Point 100° F., 30% Oil | | | | | | | | | | |
| 24 hrs. @ 90° F. | | | | | | | | | | |
| Area cm² | 706.5 | — | — | — | 143 | — | 103.4 | — | — | — |
| % of bleed | 4000+ | — | — | — | 815 | — | 591 | 60 | 5 | nil |
| Melt Point 141° F., 2.16% Oil | | | | | | | | | | |
| 24 hrs. @ 120° F. | | | | | | | | | | |
| Area cm² | 28.3 | — | — | — | — | — | — | — | — | — |
| % of bleed | 161 | 95 | 95 | 80 | 80 | 60 | — | — | — | — |

Samples are prepared by pouring 20 grams of molten wax into a standard aluminum weighting dish. The samples are allowed to solidify and are then removed from the dishes. They are then placed on cardboard, which has been covered with kraft paper. The test runs for 24 hrs. at whatever the desired temperature is.
Oil stain (bleed) is read as the % of the original wax surface in contact with the kraft paper which shows staining by the oil.

The amounts of hydrocarbon polymers employed in oils will vary widely depending on the particular oil, the particular hydrocarbon polymer, the particular properties desired in the gel or paste, etc. In general, higher percentages are employed in oils as compared to solid waxes. Thus, from about 0.5 to 99% by weight hydrocarbon polymer can be employed in the oils, such as from about 5–90%, for example from about 10–70%, but preferably from about 30–60%.

The following examples are presented for purposes of illustration and not of limitation.

TABLE 4

VYBAR ® 103 and 260 in paraffinic oil and naphthenic oil. Percent (%) is by weight.
VYBAR ®/mineral oil mixtures were heated in an oven to 225° F. and cooled with hand stirring to 5° F. above the solidification point. Specimens were aged for 14 hours at room temperature and cone penetration at 77° F. was taken (ASTM D-938/15 g cone).

| % VYBAR ® 260 | % Paraffinic Oil | Penetration Values |
|---|---|---|
| 50 | 50 | 17.5 |
| 40 | 60 | 30 |
| 30 | 70 | 53 |
| 20 | 80 | 127 |
| 10 | 90 | 336 |
| VYBAR ® 103 | Paraffinic Oil | Penetration Values |
| 50 | 50 | 9 |
| 40 | 60 | 11 |
| 30 | 70 | 24 |
| 20 | 80 | 64 |
| 10 | 90 | 170 |
| VYBAR ® 260 | Naphthenic Oil | Penetration Values |
| 50 | 50 | 20 |
| 40 | 60 | 30 |
| 30 | 70 | 52 |
| 20 | 80 | 107 |
| 10 | 90 | 335 |
| VYBAR ® 103 | Naphthenic Oil | Penetration Values |
| 50 | 50 | 8 |
| 40 | 60 | 12 |
| 30 | 70 | 23 |
| 20 | 80 | 65 |
| 10 | 90 | 220 |

By means of this invention oils can be upgraded to, and used as a wax or waxy paste in any suitable application such as a polish, etc.

While certain representative embodiments have been shown for purposes of illustration, various modifications can be made without departing from the spirit and scope of the invention.

We claim:

1. An oil-containing wax characterized by the presence of sufficient hydrocarbon polymer to inhibit the exudation of the oil to the surface of the wax, said hydrocarbon polymer having congealing and melting points which are essentially no higher than those of its starting materials, said hydrocarbon polymer prepared by polymerizing a hydrocarbon starting material consisting primarily of alpha olefins and which is a solid at room temperature, in the presence of a source of free radicals under pressure of less than 500 psi but sufficient to keep the reactants from vaporizing and at a temperature of about 40° to 250° C.

2. The product of claim 1 where the oil-containing wax is a natural wax or a petroleum hydrocarbon wax.

3. The product of claim 2 where the hydrocarbon polymer is prepared by polymerizing an alpha olefin fraction having mostly $C_{30}$ and higher in the presence of a peroxide or hydroperoxide free radical forming catalyst under said pressure and at said temperature.

4. The product of claim 3 where the oil-containing was is a paraffin wax with an oil content of at least 0.5%.

5. The product of claim 3 where the oil-containing wax is a microcrystalline wax.

6. An oil characterized by the presence of sufficient hydrocarbon polymer to thicken said oil, said hydrocarbon polymer having congealing and melting points which are essentially no higher than those of its starting materials, said hydrocarbon polymer prepared by polymerizing a hydrocarbon starting material consisting primarily of alpha olefins and which is a solid at room temperature, in the presence of a source of free radicals under pressure of less than 500 psi but sufficient to keep the reactants from vaporizing and at a temperature of about 40° to 250° C.

7. The product of claim 6 where the oil is an animal oil.

8. The product of claim 6 where the oil is a vegetable oil.

9. The product of claim 6 where the oil is a petroleum oil.

10. The product of claim 9 where the hydrocarbon polymer is prepared by polymerizing an alpha olefin fraction having mostly $C_{30}$ and higher in the presence of a peroxide or hydroperoxide free radical forming catalyst under said pressure and at said temperature.

11. The product of claim 10 where the oil is a paraffinic or naphthenic oil.

* * * * *